July 1, 1924.

J. G. STECH

COMPOUND TOOL

Filed Nov. 23, 1922

Witnesses:

Inventor
Joseph G. Stech
By Joshua R. H. Roth.
His Attorney

Patented July 1, 1924.

1,499,416

UNITED STATES PATENT OFFICE.

JOSEPH G. STECH, OF BERWYN, ILLINOIS, ASSIGNOR TO WOODROW NIPPLE MFG. CO., OF CHICAGO, ILLINOIS.

COMPOUND TOOL.

Application filed November 23, 1922. Serial No. 602,862.

*To all whom it may concern:*

Be it known that I, JOSEPH G. STECH, a citizen of the United States, and a resident of Berwyn, county of Cook, and State of Illinois, have invented certain new and useful Improvements in Compound Tools, of which the following is a specification.

My invention relates to compound tools for trimming down the burred ends of nipples or pipes, and has for its principal object the provision of a tool which will chamfer, ream, and square off or finish the end of a nipple or pipe simultaneously and in a single operation.

Other objects will appear hereinafter.

The invention consists in the combinations and arrangements of parts hereinafter described and claimed.

The invention will be best understood by reference to the accompanying drawings forming a part of this specification, and in which, Fig. 1, is a view of my compound tool;

Fig. 2, is a longitudinal sectional view taken on line 2—2 of Fig. 1;

Figs. 3, 4, and 5 are detail views of the finishing, reaming and chamfering cutters, respectively;

Figure 7:
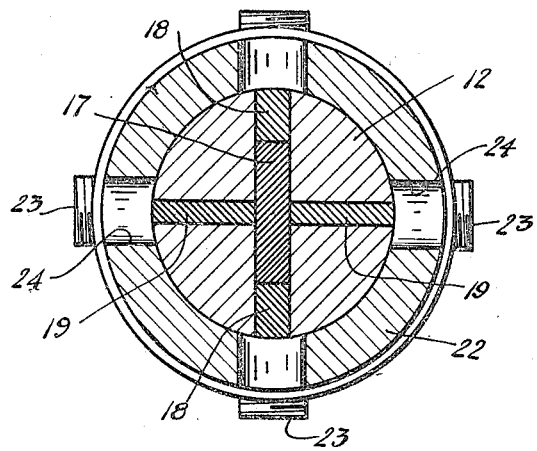
Fig. 7, is a cross-sectional view taken on line 7—7 of Fig. 2.
Figure 8:
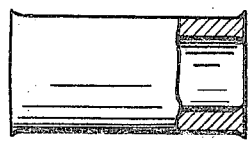
Fig. 8, shows a nipple in the rough or unfinished state.

The form of my invention illustrated in the drawings comprises a circular body member or reaming head 12 tapering slightly toward the front and more abruptly toward the rear, substantially providing a beveled or reduced rear end 13, said tapering parts appearing in the form of two truncated cones joined at their bases. A threaded stem 14 extends from said beveled end 13 and is adapted to be engaged by a suitable operating member (not shown) for supporting and rotating the device. Slots 15 and 16, extending longitudinally and diametrically of the reaming head 12 and at right angles to each other, are provided in the forward part of said head, and a reamer or reaming cutter 17 is mounted in the central part of the larger slot, 15, while a chamfering cutter 18 is mounted at each side of reamer 17, in the two outer parts of said slot 15, extending flush with the circumference of head 12, as best seen in Fig. 7. Two squaring-off cutters or finishing cutters 19 are mounted in slot 16, each extending from reamer 17 to the circumference of head 12, each of said cutters being provided with a tip 20 closely engaging the reamer 17, as best seen in Figs. 2 and 3.

Figure 1:
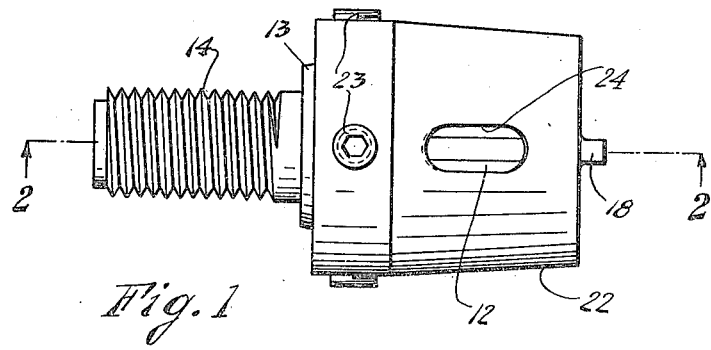
Figure 2:
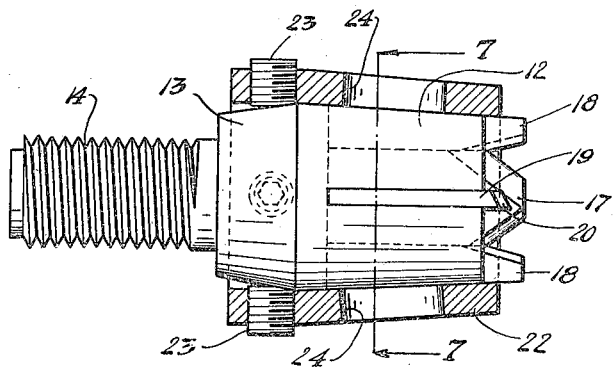
Figure 3:
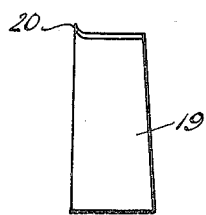
Figure 4:
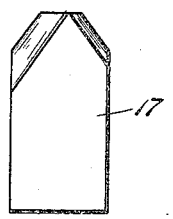
Figure 5:
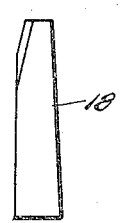
Figure 6:
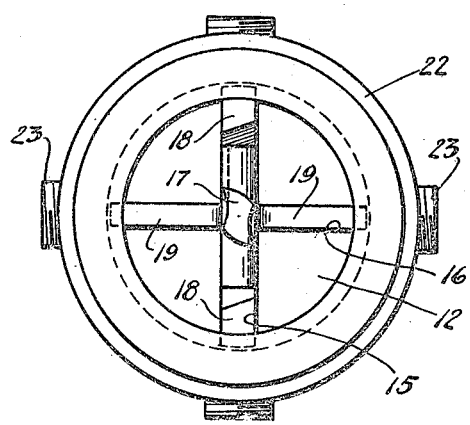
Fig. 6, is an end view of the device.
Figure 9:
Fig. 9, shows the nipple in its finished state, after the chamfering, reaming and finishing cutters have completed their work.

The cutting members 17, 18 and 19 extend substantially the entire length of the respective slots 15 and 16 and protrude from the front of the reaming head, each being provided with beveled cutting edges of suitable pitch, the reamer 17 having two tapering cutting edges and the chamfering cutters 18 having each one tapering cutting edge, as best seen in Figs. 2, 4, and 5. Suitable clearance is provided between the tapering cutting edges of members 17 and 18, as shown in the drawings, in order to produce properly trimmed nipple or pipe ends, as illustrated in Fig. 9.

A shell or sleeve 22 is provided to hold the cutters 17, 18 and 19 securely in position. This shell is mounted over the reamer head and its cutters with a driving fit, and hollow headed screws 23 are placed in screw openings provided in the rear part of said shell, and engage the beveled part 13 to hold said shell on the head and retain the cutters positively in position. Slots or notches 24 are cut in the wall of said shell or sleeve to furnish a toe-hold for a suitable punch or tool in order to force or drive said shell circumferentially on the head and loosen it for removal therefrom.

It becomes apparent from the above disclosure that the cutters may be removed to be sharpened or adjusted by loosening screws 23, tapping the shell with a suitable tool positioned in the slots 24 to rotate and remove said shell, and then lifting or driving the cutters out from their slots; and it is further apparent that said cutters may be reinserted and suitably adjusted in said slots as the cutting edges are sharpened down, or new cutters may be introduced, by an operation reverse of that above described, and that by fastening the screws 23 against the beveled portion 13 the shell will hold the cutting members securely in position. It is also evident from the above disclosure that the device will simultaneously and speedily ream, chamfer, and square-off or finish the end of a nipple or pipe.

Having described my invention, what I claim as new and desire to secure by Letters Patent is:

1. A tool comprising a reaming head tapering toward the front and rear and having slots in the forward part, reaming, chamfering and finishing cutters removably mounted in said slots substantially filling the same and extending forward therefrom, a shell movable in a longitudinal direction on said head, and fastening means rotatably mounted in said shell engaging the rear tapering part of said head rearward of said cutters.

2. A tool comprising a reaming head tapering forward and rearward, and having slots in the forward part which extend longitudinally and diametrically of said head and at right angles to each other, reaming and chamfering cutters mounted in one slot and extending flush with the circumference of said head, finishing cutters mounted in the other slot at right angles to said latter slot, a tapered shell driven over the forward tapering part of said head, said reaming and chamfering cutters extending forward of said head and shell, and means on said shell movable into engagement with said rearward tapering part of the head for urging said shell in an axial direction on said head and to fasten and retain the elements in position.

3. A tool comprising a reaming head tapering toward the front and rear, slots in the forward part of said head, tools arranged in said slots, a shell movable longitudinally on the front portion of said head to lock said tools in said slots and means on said shell engaging the rearwardly tapering portion of the head for holding the shell in position, substantially as described.

In testimony whereof I have signed my name to this specification in the presence of two subscribing witnesses.

JOSEPH G. STECH.

Witnesses:
 MAX LEVIN,
 FRANK RUZEK.